INVENTORS
WILLIAM L. ROGERS
ROBERT L. NOLAND
BY
D. Gordon Angus
ATTORNEY

INVENTORS
WILLIAM L. ROGERS
ROBERT L. NOLAND
BY
D. Gordon Angus
ATTORNEY

Feb. 19, 1957 W. L. ROGERS ET AL 2,781,633
APPARATUS FOR MOUNTING SOLID PROPELLANT
GRAINS IN A ROCKET MOTOR
Filed April 15, 1949 4 Sheets-Sheet 3

INVENTORS
WILLIAM L. ROGERS
ROBERT L. NOLAND
BY
D. Gordon Angus
ATTORNEY

INVENTORS
WILLIAM L. ROGERS
ROBERT L. NOLAND
BY
D. Gordon Angus
ATTORNEY

United States Patent Office 2,781,633
Patented Feb. 19, 1957

2,781,633

APPARATUS FOR MOUNTING SOLID PROPELLANT GRAINS IN A ROCKET MOTOR

William L. Rogers, Covina, and Robert L. Noland, Duarte, Calif., assignors, by mesne assignments, to Aerojet-General Corporation, Cincinnati, Ohio, a corporation of Ohio Application April 15, 1949, Serial No. 87,626

11 Claims. (Cl. 60—35.6)

This invention relates to rockets or rocket motors and has for its principal object to provide supporting means for solid propellant charges, partciularly multiple grain charges (capable of holding the charge units securely in place at all times, including firing, thus preventing the grains from cracking, breaking or becoming dislodged especially during the burning period).

A rocket, or rocket motor, of the type burning a solid propellant charge, ordinarily comprises a chamber containing the propellant, an exhaust nozzle leading from the chamber through which the gases and products of decomposition, or combustion, escape at high velocity, generating the reactive thrust which drives the rocket. The propellant charge employed in rockets is ordinarily a fast burning composition that carries within it sufficient oxygen to insure complete decomposition or combustion of the fuel component. A suitable type of propellant material which may be used, for example, is an alkyd resin matrix into which there is incorporated sufficient oxidizing material. The propellant grains are commonly cast separately and inserted in the chamber of a rocket chamber where they are ignited when it is desired to place the rocket in operation.

When the total propellant mass is large it is preferable to provide a charge consisting of several separate grains and to assemble them to form a composite grain before the charge is inserted in the motor firing chamber. In such case, the individual grains of the composite charge should be supported in the desired space relationship with each other and with the chamber walls.

Furthermore, it is important that the burning area of the propellant grain remain substantially constant from the start to the end of the burning period in order that the correct volume of gas can be generated and the pressure maintained constant during the operation of the rocket motor. If the burning surfaces of the charge were to increase substantially beyond the desired area, as is the case when cracks occur or when any portion of the charge becomes broken, the burning rate would increase and may in some instances result in an explosion. It is accordingly important that the propellant grain or grains be securely supported and positioned to permit burning to occur over the required area. Also the support should protect the charge from breakage, cracks, fissures or other damages that might occur due to rough handling.

According to the present invention, supporting means is provided for securing a multiple grain propellant charge in the desired position within the combustion chamber and for protecting the charge from damage, such as cracking, while at the same time exposing the surfaces to burning and insuring satisfactory venting and free egress of the products of combustion through the exhaust nozzle.

The device, according to our invention, individually supports each propellant grain at all times including the period when the grain is being burned, and is constructed in such a manner that none of the load from one grain is transferred to any other grain during periods of acceleration, or when there is a differential chamber pressure surrounding the various grains.

A feature of the construction is the provision of forward, intermediate, and rearward, holding plates mounted on a longitudinal support, preferably a bolt or the like extending substantially the length of the composite charge. These hold the charge in proper space relationship with reference to the side wall of the motor.

The supporting structure is especially adapted for use with grains of a cylindrical shape.

According to a preferred feature, the rearward pressure plate holding the rear end of the rearmost grain, is fixed relative to the chamber, and the remaining pressure plates holding the other ends of the grains in the chamber are made adjustable.

A preferred feature of the construction is the reduction in cross-section toward the rear, of the central supporting rod; which serves to decrease the weight of the assembled unit.

A further feature is the provision of the forward press plate adjustment for compensating for variations in the length of the assembled charge.

The foregoing and other features of our invention will be better understood with reference to the accompanying drawings of which:

Figure 1:
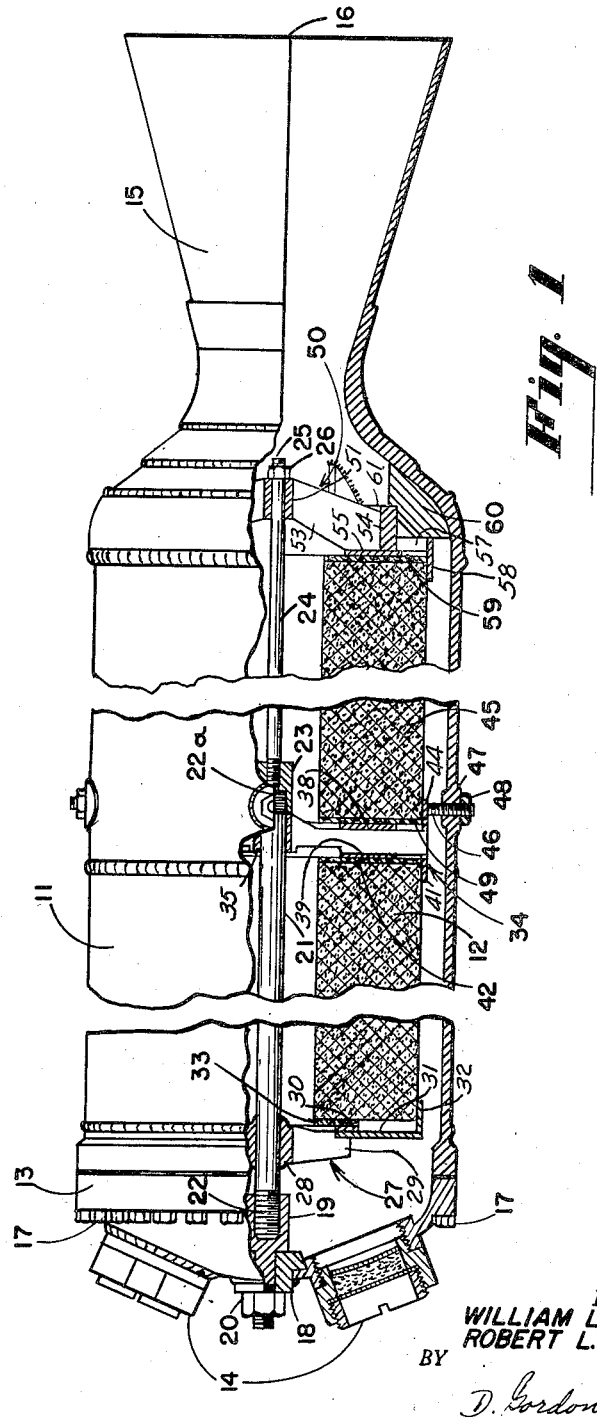
Fig. 1 is a longitudinal view partly in cross section of the rocket motor and charge supported and arranged in accordance to this invention.

The rocket motor shown in the accompanying drawings comprises a cylindrical-shaped firing chamber 11 which contains a plurality of cylindrical propellant grains 12 and 45 arranged end to end. The chamber is closed at its forward end by a cap 13 preferably provided with blowout safety diaphragms 14, the cap being secured to the firing chamber by a plurality of bolts 17. The opposite end of the reaction chamber is provided with an exhaust nozzle 15 having the usual opennig 16 through which the gases, generated during combustion of the propellant, escape at high velocity to provide the thrust.

To support the propellant grains in position there is provided supporting equipment as follows: Forward cap 13 is provided with a central boss 18 having a hole through it which receives a shouldered coupling member 19 held in place by a nut 20. The rearward end of coupling member 19 is provided with an axial bore that is threaded for a sufficient distance to receive threads 22 at the forward end of a rod 21. Threads 22a at the rear end of the rod engage corresponding threads in a coupling member 23 the rearward end of which is provided with a threaded central bore which engages the forward end of another axially aligned rod 24. A plurality of these rods, such as 21 and 24, may be employed in axial alignment with each other in which case the ends of each successive rod will be held in a coupling member like member 23. Each succeeding rod in the rearward direction may usually be made smaller in cross-section than the preceding rod, although this reduction in size is not essential. The end of the rearmost rod 24 is threaded with threads 25 which receive a nut 26.

Figure 4:
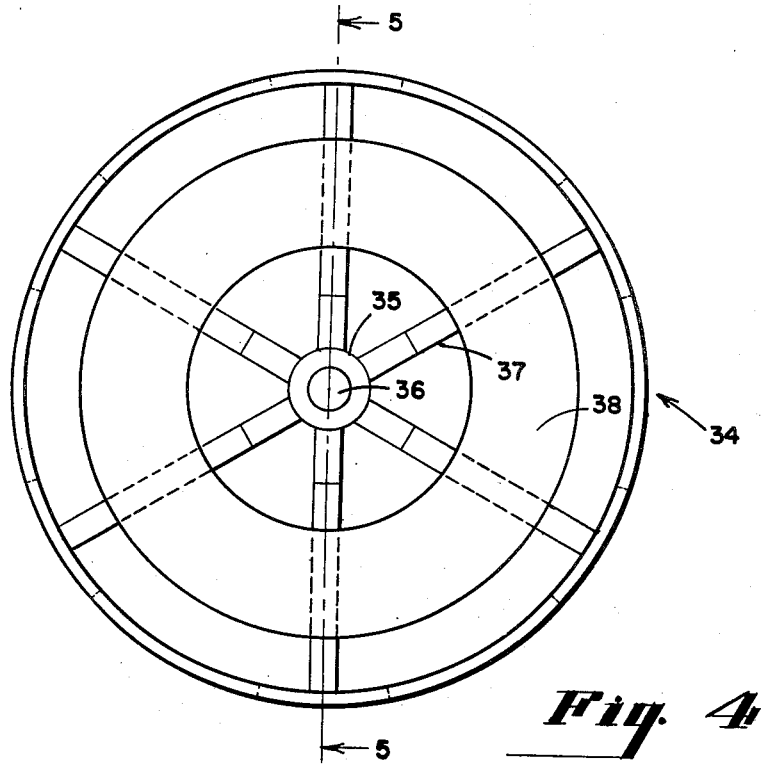
Fig. 4 is a plan view of an intermediate support.
Figure 5:
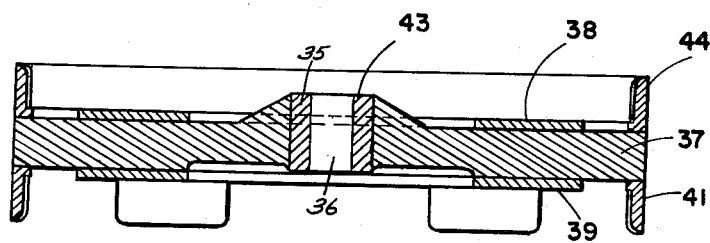
Fig. 5 is a cross section view taken on the line 5—5 of Fig. 4.
Figure 6:
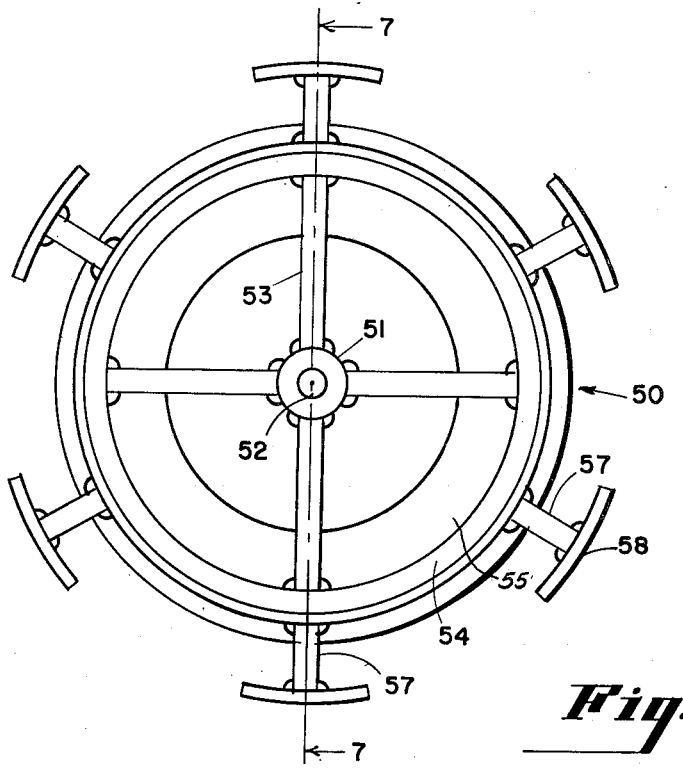
Fig. 6 is a plan view of the aft support.
Figure 7:
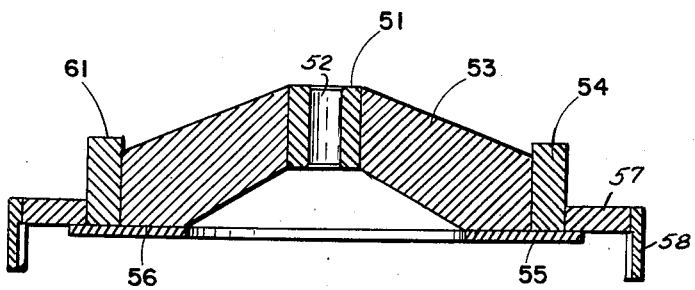
Fig. 7 is a cross section view taken on the line 7—7 of Fig. 6.

The principal support for the sides of the propellant grain is provided by a number of trap assemblies centrally mounted upon their respective rods. The foremost trap assembly 27 is illustrated in Figs. 2 and 3; the intermediate trap assembly 34 is illustrated in Figs. 4 and 5; and the rearmost trap assembly 50 is illustrated in Figs. 6 and 7.

It should be understood that there may be one or more traps intermediate the front and rear traps, depending upon the number of sections into which the grain is divided. In the example shown in Fig. 1, only one such intermediate trap is shown; and any others could be made as shown in Figs. 4 and 5, differing perhaps only in the size of the central bore, which is determined by the diameter of the supporting rod on which it rides.

Figure 2:
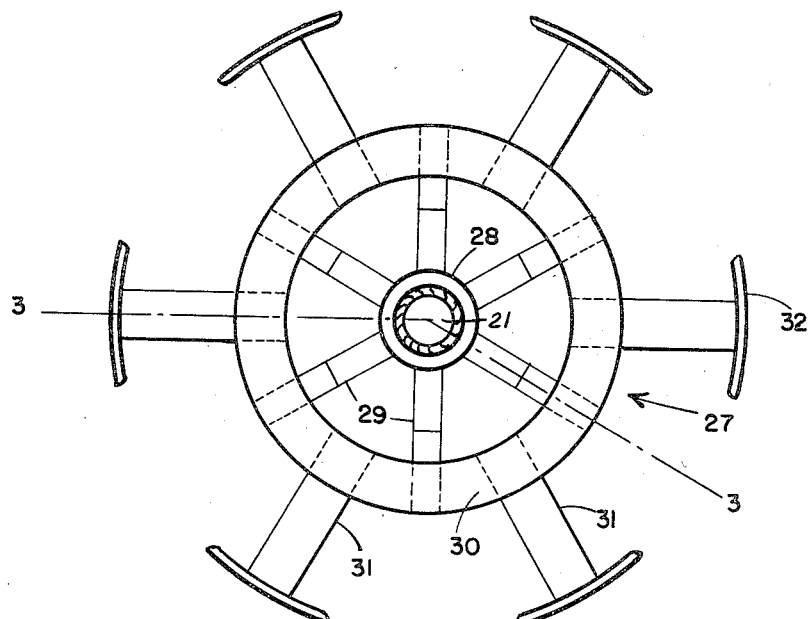
Fig. 2 is a plan view of the forward supporting member.
Figure 3:
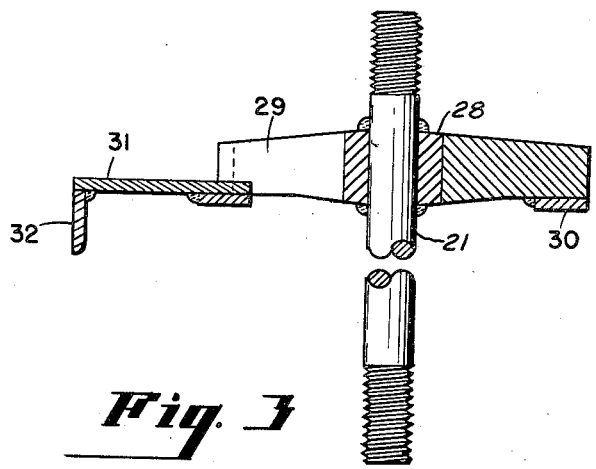
Fig. 3 is a cross section view taken on the line 3—3 of Fig. 2.

The forward supporting trap assembly 27, shown in detail in Figs. 2 and 3, comprises a central annular bearing or bushing 28 which is fastened, preferably by welding, to the forward portion of rod 21 at the desired location. A plurality of radiating legs 29 are welded, or otherwise secured, to the central bushing, and these support an annular disc 30, the central portion of which is cut out to permit unobstructed flow of gases and also to eliminate excess weight.

A plurality of radially extending arms 31 are welded, or otherwise secured, to the annular disc 30, and these project a sufficient distance to permit arcuate retainers 32, secured to the ends thereof, to encircle propellant grain 12. A gasket 33, preferably of a slow-burning compressible material such as, for example, cork or felt, is preferably placed between the end of the grain 12 and the rear surface of the annular disc 30.

Intermediate trap assembly 34, shown in detail in Figs. 4 and 5, comprises a central bearing 35 and is provided with a clearance hole 36 approximately the same size as the diameter of rod 21 on which it seats. A plurality of legs 37 radiate from central bearing 35 and are welded, or otherwise secured thereto; and these legs support a pair of annular discs 38 and 39, one on each side of the legs. Disc 39 rests against the rearward end of the forward propellant grain 12. The ends of legs 37 are provided with arcuate angle tabs 41 on the side to which annular disc 39 is welded, the tabs forming a discontinuous circle, which engages the cylindrical side of the rearward end of the forward grain unit 12. A gasket 42 is preferably placed between annular disc 39 and the rearward end of propellant grain 12.

The rearward side 43 of central bushing 35 rests against the forward end of coupling member 23 and the first unit of the grain is securely supported by tightening the coupling member 23 until sufficient pressure is exerted upon the annular disc 39.

On the opposite side of legs 37 from the place at which annular disc 39 is secured, is another similar annular disc 38; and also a continuous circular band of metal 44 welded to the ends of the legs 37 and projecting for some distance beyond the level of annular disc 38. The circular band 44 serves the purpose of retaining the cylindrical side at the forward end of the second charge unit 45 when the forward end of the charge is rested against annular disc 38, preferably with a gasket 49 therebetween; and the band also presents a continuous exterior surface against which the ends of spacing bolts 46, threaded through the cylindrical wall of the chamber, may rest. By means of these bolts the band 44 may be centered within the chamber and then secured by locking nuts 48.

Although only one intermediate trap assembly 34 has been shown, it will be understood that additional ones may be used if desired. If a three or four unit charge is used, a corresponding number of these intermediate trap assemblies may be employed.

The rearward trap assembly 50 rests against the rearward end of the last unit 45 of the grain. The assembly 50, shown in detail in Figs. 6 and 7, comprises a central bearing 51 provided with an axial bore 52 that is large enough to permit the bearing to slide on the rearmost rod 24. A plurality of radial arms 53 are secured to the central bushing 51 by suitable means, such as welding, and extend outward and obliquely forward, their extremities being attached to an annular member 54.

An annular disc 55 is secured to the forward side of cylindrical member 54 and to the squared-off edge 56 of the arms 53, by welding or other suitable means. The outer diameter of annular disc 55 is slightly larger than the outer diameter of annular cylindrical member 54; which enables a plurality of radiating short arms 57 to be secured to the outer surface of cylindrical member 54 and to the rear surface of annular disc 55, by welding or other suitable means. The ends of arms 57 are provided with short arcuate ears 58, forming a discontinuous circle, the ears being welded to the arms 57, and projecting a sufficient distance beyond the front surface of annular disc 55 so as to encompass the rear end of grain 45 when the latter is rested against annular disc 55. Preferably a gasket 59 is placed between the disc 55 and grain 45. A nut 26 is screwed up on supporting rod 24 until it places grain 45 under sufficient compression to hold it firmly.

A plurality of projections 60 are uniformly spaced within the throat of the nozzle 15; and these are secured in place by welding against the reducing portion of the nozzle. The inner and forward ends of these projections are notched to receive the rear edge 61 of annular cylindrical member 54 forming a surface against which the annular cylindrical member rests, thereby relieving side strains which would otherwise result if a substantial portion of the propellant grain should overhang the last spacing bolt 46.

In assembling the motor, the forward trap assembly 27 is firmly affixed near the forward end of forward supporting rod 21. The forward unit 12 of the propellant charge is then slipped over the central rod 21 up to the annular disc 30, preferably with a gasket between the annular disc and the charge. The intermediate trap assembly 34 is then slipped over the rod 21 placing the annular disc 39 of the intermediate support in contact with the rearward end of the propellant grain 12, with gasket 42 between the grain and the annular disc.

A coupling member 23 is threaded on the rearward end of rod 21 so that its forward end pushes against the end 43 of the bearing 35 of the intermediate trap assembly; and thus the coupling member 23 acts as a clamping member. This locks the forward grain in place and the pressure against the grain can be adjusted by tightening or loosening the coupling member 23.

The second rod 24 of smaller diameter than rod 21 is then threaded into the rearward end of coupling member 23. The second unit 45 of the propellant charge is then slipped over the rod 24 with its forward end resting against annular disc 38 of the intermediate trap assembly, with gasket 49 therebetween. The opposite end of the unit 45 of the propellant charge is held in place by the rearward trap assembly 50 which is also slipped on rod 24. Gasket 59 is placed between the surface of annular disc 55 of rearward trap assembly and the rearward end of the propellant grain 45. The rearward trap is held tightly against the grain by nut 26 which is threaded on the rearward end of central supporting rod 24, and the pressure on the grain may be regulated by loosening or tightening nut 26.

The assembled grain is inserted into the chamber 11 and pushed towards the nozzle until the cylindrical annular member 54 of the rearward trap assembly rests against the notches in the supporting projections 60. When in this position bolts 46, located in a circumference of the chamber 11, are adjusted until the ring 44 of the intermediate trap assembly is centrally positioned within the chamber.

Shouldered bushing 19 is then threaded onto the forward end of rod 21 and cap 13 of the motor is placed in position with the threaded portion of shoulder bushing 19 projecting through the central boss 18. Bolts 17 which hold the cap in place are all tightened and then the nut 20 is threaded on the projecting end of bushing 19, holding the entire assembly securely in place at the forward end.

The device according to our invention has the advantage that it insures positive support for large propellant grains, and provides a construction which requires the minimum of weight and does not offer any obstruction to the quick and rapid egress of the gases generated during the combustion of the charges within the chamber.

A further advantage of our construction is that it is rugged enough to withstand rough handling and will at all times hold the charge within the chamber in proper space relationship to the side walls.

We claim:

1. In a rocket motor having a forward closure member, a firing chamber, and an exhaust nozzle opening from the rear of said chamber: means for supporting a plurality of solid propellant grains within the chamber, said means comprising a rod means disposed centrally and longitudinally within the chamber, a front trap within the front end of the chamber, a rear trap within the rear end of the chamber, and an intermediate trap within the chamber located between the front and rear traps, said traps being mounted on said rod means, means for clamping adjacent traps against respective ends of said grains, said last-named means comprising means fastening the first trap to the rod means and a clamping member threaded to the rod means at the rear of the intermediate trap and turned up against the intermediate trap and a threaded nut on the rod means at the rear trap and turned up against the rear trap, means at the chamber side of the nozzle for supporting said rearward trap, means for centrally positioning said intermediate trap, and means attached to said forward closure member for centrally supporting said forward trap.

2. A combination according to claim 1 in which the central rod means comprises a plurality of rods located end to end, the adjacent rods being joined by couplings, the rearmost rod being of smaller cross-section than the foremost rod.

3. In a rocket motor comprising a cylindrical chamber with a constricted nozzle opening from the rear of said chamber coaxially with the longitudinal axis of the chamber: means for supporting within the chamber in spaced relationship with the wall of said chamber, a plurality of solid cylindrical propellant grains each provided with a longitudinal axial hole extending therethrough, a rod supported coaxially within the chamber, said grains being supported in end-to-end relationship with the rod passing through their holes, said supporting means comprising traps fastened to the rod and each grain being held at its ends between a pair of adjacent traps, said supporting means also comprising means fastening the foremost trap to the rod and a clamping member threaded to the rod at the rear of an intermediate one of said traps and turned up against the intermediate trap and a threaded nut on the rod at the rear of the rearmost one of said traps and turned up against said rearmost trap.

4. Apparatus according to claim 3 in which each trap is provided with an annulus engaging the ends of the respective grains.

5. Means for supporting a plurality of solid propellant grains in end-to-end relationship within the chamber of a rocket motor, said means comprising a rod mounted within the chamber and passing axially through all the grains, a plurality of traps mounted on the rod, each trap having radially extending arms, an annulus fastened to the arms of each trap and engaging the respective ends of the propellant grains, and flange means mounted on the radial arms beyond the annulus, and engaging the cylindrical peripheries of the grains.

6. Apparatus according to claim 5 in which there are at least two propellant grains, and at least one trap intermediate the forward and rear traps.

7. Apparatus according to claim 5 in which the ends of adjacent grains are somewhat separated from each other.

8. In a rocket motor having a forward closure member, a firing chamber, and an exhaust nozzle opening from the rear of said chamber: means for individually supporting a plurality of solid propellant grains within the cylinder, said means comprising a rod means disposed centrally and longitudinally within the chamber, a forward trap within the front end of the chamber, a rearward trap end of said chamber, and intermediate traps located within the chamber between the said front and said rear traps, said traps being mounted on said rod means, and means for clamping adjacent traps against the respective ends of said grains, said clamping means comprising means fastening the forward trap to the rod means and a coupling member threaded to the rod means at the rear of an intermediate trap and turned up against the intermediate trap and a threaded nut on the rod means at the rear of the rearward trap turned up against the rearward trap, said coupling member coupling sections of said rod means, means at the chamber side of the nozzle for supporting said rearward trap, means for centrally positioning all said intermediate traps and means attached to said forward closure member for centrally supporting said forward trap.

9. In a rocket motor having a forward closure member, a firing chamber, and an exhaust nozzle opening from the rear of said chamber: means for supporting a plurality of solid propellant grains within the chamber, said means comprising a rod means disposed centrally and longitudinally within the chamber, a front trap within the front end of the chamber, a rear trap within the rear end of the chamber, and an intermediate trap within the chamber located between the front and rear traps, said traps being mounted on said rod means, means for clamping adjacent traps against respective ends of said grains, means at the chamber side of the nozzle for supporting said rearward trap, means for centrally positioning said intermediate trap, and means attached to said forward closure member for centrally supporting said forward trap, said means for supporting the rearward trap comprising a plurality of notched members spaced apart and attached within the nozzle, said rearward trap being supported in the notches of said notched members.

10. In a rocket motor having a forward closure member, a firing chamber, and an exhaust nozzle opening from the rear of said chamber: means for supporting a plurality of solid propellant grains within the chamber, said means comprising a rod means disposed centrally and longitudinally within the chamber, a front trap within the front end of the chamber, a rear trap within the rear end of the chamber, and an intermediate trap within the chamber located between the front and rear traps, said traps being mounted on said rod means, means for clamping adjacent traps against respective ends of said grains, means at the chamber side of the nozzle for supporting said rearward trap, means for centrally positioning said intermediate trap, and means attached to said forward closure member for centrally supporting said forward trap, said intermediate trap being centrally positioned within the chamber by a plurality of adjustable studs located at spaced positions around the circumference of the chamber.

11. In a rocket motor comprising a cylindrical chamber with a constricted nozzle opening from the rear of said chamber coaxially with the longitudinal axis of the chamber: means for supporting within the chamber in spaced relationship with the wall of said chamber, a plurality of solid cylindrical propellant grains each provided with a longitudinal axial hole extending therethrough, a rod supported coaxially within the chamber, said grains being supported in end-to-end relationship with the rod passing through their holes, said supporting means comprising traps fastened to the rod and each grain being held at its ends between a pair of adjacent traps, each trap being provided with a flange means which engages the cylindrical periphery near the ends of the grains.

References Cited in the file of this patent

UNITED STATES PATENTS

| | | |
|---|---|---|
| 2,405,415 | Eksergian | Aug. 6, 1946 |
| 2,406,560 | Pope | Aug. 27, 1946 |